(12) United States Patent
Marrazzo et al.

(10) Patent No.: US 11,054,324 B2
(45) Date of Patent: Jul. 6, 2021

(54) COUPLING LOAD MEASUREMENT METHOD AND DEVICE

(71) Applicant: Nuovo Pignone Srl, Florence (IT)

(72) Inventors: Marco Marrazzo, Florence (IT);
Daniele Marcucci, Florence (IT);
Stefano Cioncolini, Florence (IT);
Filipo Gerbi, Florence (IT)

(73) Assignee: Nuovo Pignone Srl, Florence (IT)

( * ) Notice: Subject to any disclaimer, the term of this patent is extended or adjusted under 35 U.S.C. 154(b) by 0 days.

(21) Appl. No.: 15/535,093

(22) PCT Filed: Nov. 26, 2015

(86) PCT No.: PCT/EP2015/077720
§ 371 (c)(1),
(2) Date: Jun. 12, 2017

(87) PCT Pub. No.: WO2016/091597
PCT Pub. Date: Jun. 16, 2016

(65) Prior Publication Data
US 2017/0343435 A1 Nov. 30, 2017

(30) Foreign Application Priority Data
Dec. 12, 2014 (IT) .............................. CO2014A0042

(51) Int. Cl.
*G01L 5/12* (2006.01)
*G01M 15/14* (2006.01)
(Continued)

(52) U.S. Cl.
CPC ................. *G01L 5/12* (2013.01); *G01B 7/31* (2013.01); *G01M 15/14* (2013.01); *F16C 19/522* (2013.01)

(58) Field of Classification Search
CPC ............. G01L 5/12; G01M 15/14; G01B 7/31
See application file for complete search history.

(56) References Cited

U.S. PATENT DOCUMENTS 4,077,255 A 3/1978 Murakami
4,872,751 A 10/1989 Hercher
(Continued)

FOREIGN PATENT DOCUMENTS

CN 201013783 Y 1/2008
CN 101248317 A 8/2008
(Continued)

OTHER PUBLICATIONS

Italian Search Report and Written Opinion issued in connection with corresponding IT Application No. CO2014A000042 dated Aug. 10, 2015.
(Continued)

*Primary Examiner* — Jamel E Williams
(74) *Attorney, Agent, or Firm* — Baker Hughes Patent Org.

(57) ABSTRACT

The coupling load measurement method allows to measure load between a first driving shaft and a second driven shaft connected by a hub coupled both with the first shaft and with the second shaft by at least one flexible coupling element coupled to the hub and to the first shaft and/or to the second shaft; the method comprises, during operation of the shafts, a measurement step of measuring a distance variation respect to a reference distance between a first flange of the hub and a second flange of the flexible coupling element and the step of using the measured distance variation for calculating the load.

20 Claims, 7 Drawing Sheets

(51) Int. Cl.
*G01B 7/31* (2006.01)
*F16C 19/52* (2006.01)

(56) References Cited

U.S. PATENT DOCUMENTS

| | | | | |
|---|---|---|---|---|
| 4,918,998 | A * | 4/1990 | Periou | F16H 35/10 |
| | | | | 73/862.31 |
| 5,062,306 | A * | 11/1991 | Gotoh | G01L 3/105 |
| | | | | 73/862.331 |
| 6,105,439 | A * | 8/2000 | Roger | G01L 5/12 |
| | | | | 73/862.392 |
| 7,784,364 | B2 | 8/2010 | Matzoll et al. | |
| 2009/0136335 | A1 * | 5/2009 | Nakazeki | F16C 19/52 |
| | | | | 415/13 |
| 2010/0116044 | A1 * | 5/2010 | Mitaritonna | G01H 1/006 |
| | | | | 73/147 |
| 2012/0234107 | A1 | 9/2012 | Pindiprolu et al. | |
| 2013/0139516 | A1 * | 6/2013 | Viti | F02C 7/18 |
| | | | | 60/772 |
| 2015/0033756 | A1 * | 2/2015 | Lazzeri | F02C 7/12 |
| | | | | 60/782 |

FOREIGN PATENT DOCUMENTS

| | | |
|---|---|---|
| CN | 103003584 A | 3/2013 |
| DE | 10 2007 003 867 A1 | 7/2008 |
| EP | 0 318 345 A1 | 5/1989 |
| EP | 0 393 683 A2 | 10/1990 |
| EP | 0 918 213 A1 | 5/1999 |
| GB | 1 498 471 A | 1/1978 |
| JP | H03-107740 A | 5/1991 |
| JP | H07-040190 Y | 9/1995 |
| JP | H11-295106 A | 10/1999 |
| WO | 2008/089742 A2 | 7/2008 |
| WO | WO 2008089742 A2 * | 7/2008 ............ B63H 23/24 |
| WO | 2009155049 A2 | 12/2009 |

OTHER PUBLICATIONS

International Search Report and Written Opinion issued in connection with corresponding PCT Application No. PCT/EP2015/077720 dated Mar. 2, 2016.

International Preliminary Report on Patentability issued in connection with corresponding PCT Application No. PCT/EP2015/077720 dated Jun. 13, 2017.

First Office Action and Search issued in connection with corresponding CN Application No. 201580067633.7 dated Nov. 29, 2018 (English Translation not Available).

* cited by examiner

COUPLING LOAD MEASUREMENT METHOD AND DEVICE

BACKGROUND

Embodiments of the subject matter disclosed herein correspond to methods and devices for coupling load measurements, particularly but not limited to the turbine field.

In the mechanical field, when two rotating shaft (driving and driven) of an apparatus are to be coupled each other, it is necessary to compensate the relative displacement of the two, so as to avoid damaging the apparatus itself.

This need is further felt when one (or both) driving shaft (or the driving/driven machine in its entirety) is subject to variable (high) working temperature, that may cause thermal expansion of one shaft, leading to a respective spatial displacement between the driving and driven shaft of the coupling.

Particularly, as can be understood, this need is particularly felt in the gas turbine field, where it is a normal situation to couple the turbine shaft to a gearbox or to one (or more) compressors.

In order to connect the turbine driving shaft and the gearbox or compressor driven shaft it is known in the art to use flexible coupling with flexible elements.

Specifically, such flexible coupling elements connects the two rotating shafts (driving and driven) in order to transmit torque from one to the other, to compensate for different types of misalignment (radial or angular or both) and to compensate for axial displacement of the shafts so that neither exerts an excessive thrust on the other.

Every flexible coupling element comprises one or more flexible elements interposed between a first and a second flange parallel each other: the torque is transmitted by a coupling hub to flexible elements which are each bolted to a spacer, thereby compensating for misalignment of the two shafts.

Thanks to the use of the flexible coupling elements, the forces acting on the two shaft are therefore reduced.

Apart from the use of such coupling flexible elements, in the gas turbine field, it has been developed a method for controlling the torque transmitted between the two shafts.

Notwithstanding the use of flexible coupling elements and torque measurements, wear and eventually damages to the thrust bearings of the driven shaft may still occurs in case of excessive load.

BRIEF DESCRIPTION OF THE INVENTION

There is, therefore, a general need for measuring load on the driven shaft (and by converse on the driving shaft) so as to be able to act on the coupling or on the turbine or on the gearbox or compressor for reducing wear and damages to the thrust bearings.

An additional problem is to provide a method and a device able to perform such load measurement with great accuracy.

Another additional problem is to provide a method and a device able to perform such load measurement without interfering with the coupled apparatuses (ex. turbine/compressor).

Still another additional problem is to provide a method and a device able to perform such load measurement also in already installed apparatuses (ex. turbine/compressor) without the need for great modification of the latter.

Another problem is to provide a load measurement that is not, or limited, sensitive to thermal expansion due to relatively high temperature reached by the working shafts.

Therefore, there is a general need for an improved method and device for coupling load measurements, so as to clearly identify load occurring on the driving/driven shaft of a turbine/user coupling.

An important idea is to measure the axial load between a first driving, shafts, and a second, driven, shaft connected by means of at least one coupling flexible element by using the at least part of the coupling flexible elements as part of the measurement device: such an axial load is the major cause for thrust bearings wear and damages, since it is the consequence of an axial displacement between the driving shaft (e.g. turbine shaft) and the driven shaft (i.e. user shaft, e.g. example gearbox shaft or compressor shaft).

Another important idea, in this context is to perform such axial load measurement in a contactless manner, so to avoid interfering with the rotating shafts or with the coupling flexible elements.

One embodiment of the subject matter disclosed herein correspond to a coupling load measurement method for measuring load between a first driving, shaft, and a second, driven, shaft connected by means of an hub coupled both with the first shaft and with the second shaft by means of at least one flexible coupling element coupled to said hub and to said first shaft and/or to said second shaft, wherein the method comprises—at least during operation of the shafts—a measurement step of measuring a distance variation respect to a reference distance between a first flange of the hub and a second flange of the flexible coupling element and the step of using said measured distance variation for calculating said load.

Another embodiment of the subject matter disclosed herein correspond to a coupling load measurement device for measuring a load between a first, driving, shaft, and a second, driven, shaft connected by means of an hub coupled both with the first shaft and with the second shaft by means of at least one flexible coupling element coupled to said hub and to said first shaft and/or to said second shaft, said flexible coupling element comprising at least one elastic element, a plurality of packed elastic disks, said elastic element of said flexible coupling element being coupled with both the hub and one between the first or second shaft for transmitting torque between the two, wherein the device comprises a first flange of the hub and a second flange of said flexible coupling element, said second flange being coupled with said elastic element and at least one measuring station for measuring a distance variation respect to a reference distance between said first and second flange.

In this way, it is possible to measure the axial load on the coupled first and second shafts, by using the at least one flexible coupling element as part of the measurement device; once the distance between the two flanges has been measured, it will be possible to measure the axial force (load) acting on the shaft; particularly—under the hypothesis that the coupling between the shafts (coupling comprises first and second flexible coupling elements and the connecting hub) has the behavior of a system of springs, then it will be possible to determine or measure the axial load acting on the shaft with a quite simple mathematical relation (Hooke Law).

BRIEF DESCRIPTION OF DRAWINGS

The accompanying drawings, which are incorporated herein and constitute a part of the specification, illustrate exemplary embodiments of the present invention and, together with the detailed description, explain these embodiments. In the drawings.

DETAILED DESCRIPTION

The following description of exemplary embodiments refers to the accompanying drawings.

The following description does not limit the invention. Instead, the scope of the invention is defined by the appended claims.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

One embodiment of a coupling load measurement device is shown in FIGS. 1-8 and referenced to, as a whole, with 100.

Figure 1:
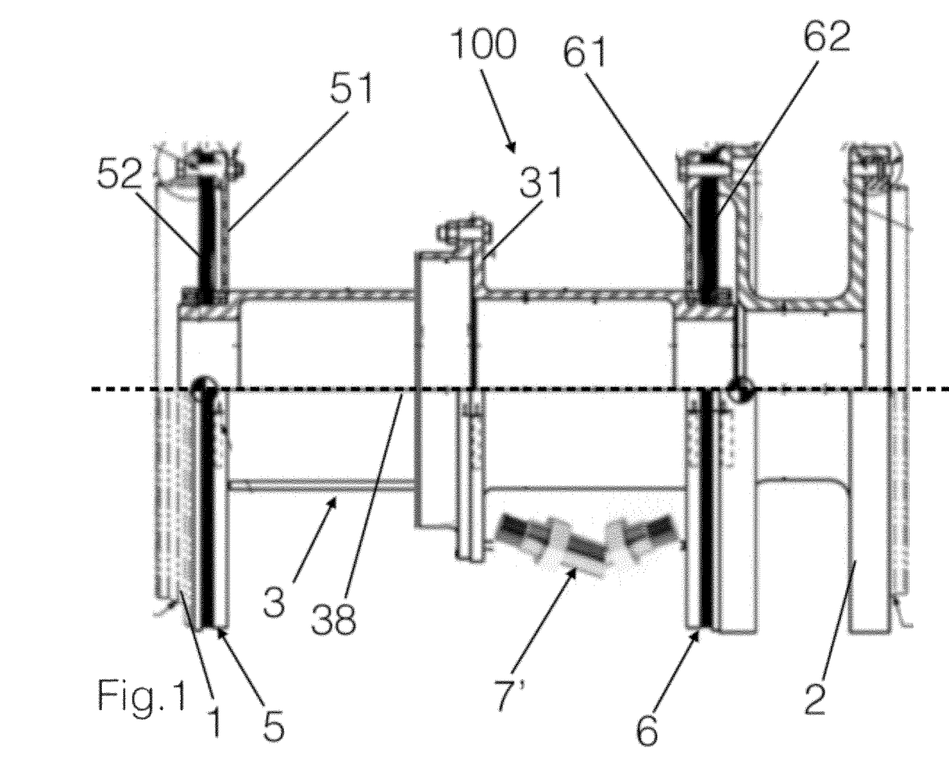
FIG. 1 shows a lateral cross-section of an exemplary embodiment of a coupling load measurement device.

The coupling load measurement device 100 serves for measuring a load between a first, driving, shaft 1, and a second, driven, shaft 2.

The driving shaft 1 is—for example—a turbine shaft, while the driven shaft 2 is a gearbox or a compressor shaft.

The two shafts 1, 2 are connected by means of a hub 3 coupled both with the first 1 and the second shaft 2.

The hub can have different shapes, depending on the particular installation; for example it can have a substantially tubular shape, as in the exemplary embodiment of the enclosed figures, Coupling between the first—1—and/or second—2—shaft comprises at least one flexible coupling element.

Such flexible coupling element 5, 6 transmit torque from one shaft 1 to the other shaft 2 and at the same time compensate for different types of misalignment (radial or angular or both) and also for axial displacement of the shafts; flexible coupling element 5, 6 are in in general known in the art and here only a brief description will be given below.

In the exemplary embodiment of the figures, two flexible coupling elements 5, 6 are shown, one flexible coupling element 5 coupled to the hub 3 and the driving shaft 1, and the second flexible coupling element 5 coupled to the hub 3 and the driven shaft 2.

It must be understood that, in other embodiments, only one flexible coupling element 5 or 6 is provided: in this case one of the two shafts (1 or 2) is directly coupled with the hub, while the other shaft (2 or 1) is coupled with the hub by means of one flexible coupling element 5 or 6.

In the exemplary embodiment, every flexible coupling element 5,6 comprises at least one elastic element 52,62 coupled with both the hub 3 and one between the first or second shaft 1,2 for transmitting torque between the two during operation.

In one embodiment said elastic element 52, 62 comprises a plurality of packed elastic disks, coupled with the hub and the shaft at a central and a peripheral areas of the packed disks, so that the latter can elastically compensate reciprocal misalignment between the hub and the shaft, due to different causes (ex. thermal growth).

According to the exemplary embodiment the device 100 further comprises a first flange 31 of the hub 3 and a second flange 61 of said flexible coupling element 6.

It has to be noted that in the embodiment the second flange 61 is a flange of the flexible coupling element 6 that connects the hub 3 with the driven shaft 2, but, in other embodiments (not shown) the second flange is the flange 51 of the flexible coupling element 5 that connects the hub 3 with the driving shaft 1.

Using a second flange 61 of the flexible coupling element 6 that connects the hub 3 with the driven shaft 2 has nevertheless some advantages related to a reduced thermal stresses, when the first shaft is a turbine shaft.

Said second flange 51, 61 is coupled with said elastic element 52,62 so as to move substantially together with the latter.

The device 100 further comprises at least one measuring station 7',7" for measuring a distance variation respect to a reference distance between said first and second flange.

In the exemplary embodiment two of said measuring station 7',7" are shown, for reason explained below; it must be understood that one measuring station 7',7" only can be provided.

In the exemplary embodiment, the measuring station 7' and/or 7" comprises at least one sensor for measuring the distance variation respect to a reference distance between said first and second flange, and in one embodiment an eddy current sensor.

The reference distance is the measured distance between the first and second flange in a non operating condition of the shafts (when their rotation speed is about zero).

Figure 3:
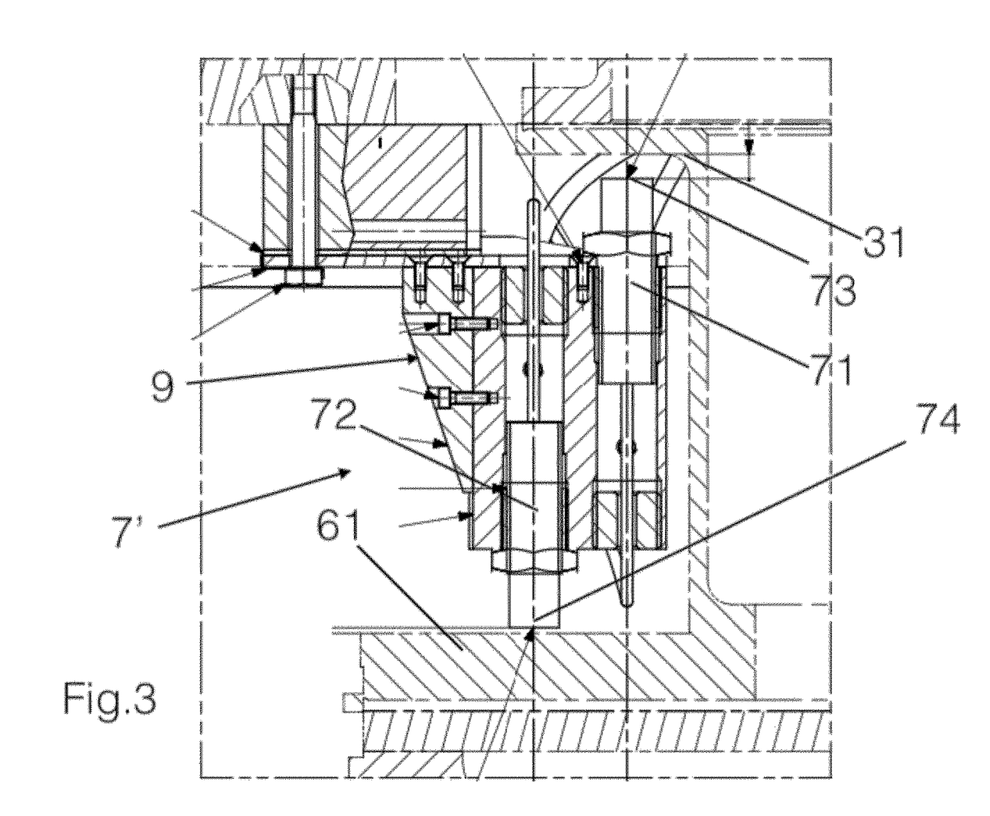
FIGS. 3, 4, 5, and 6 show different cross section of a measuring station of the load measurement device of FIGS. 1 and 2.
Figure 4:
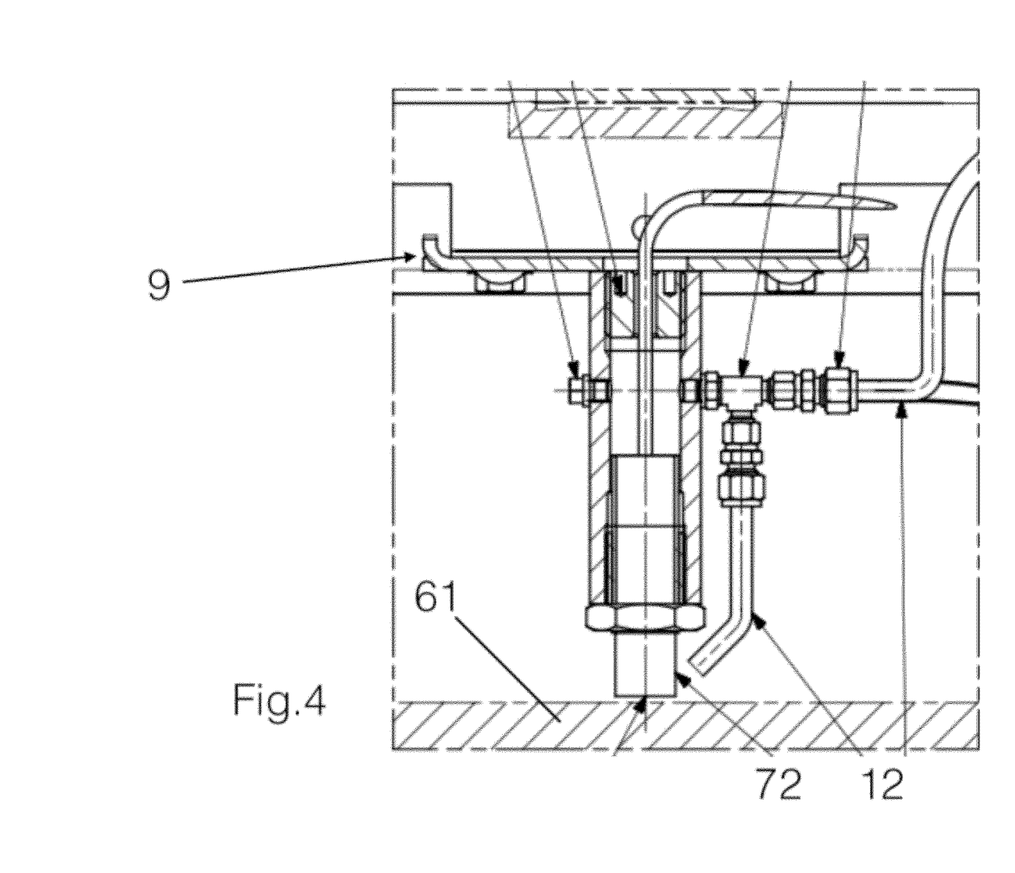
Figure 5:
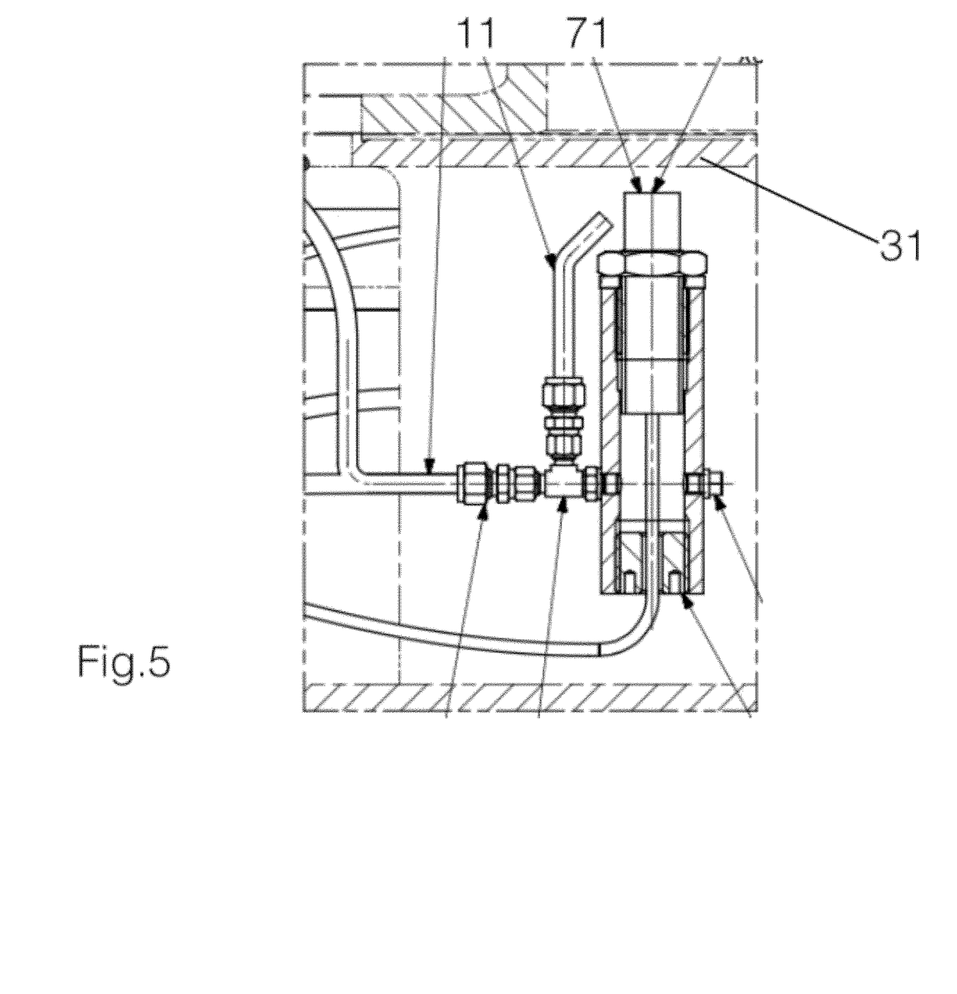
Figure 6:
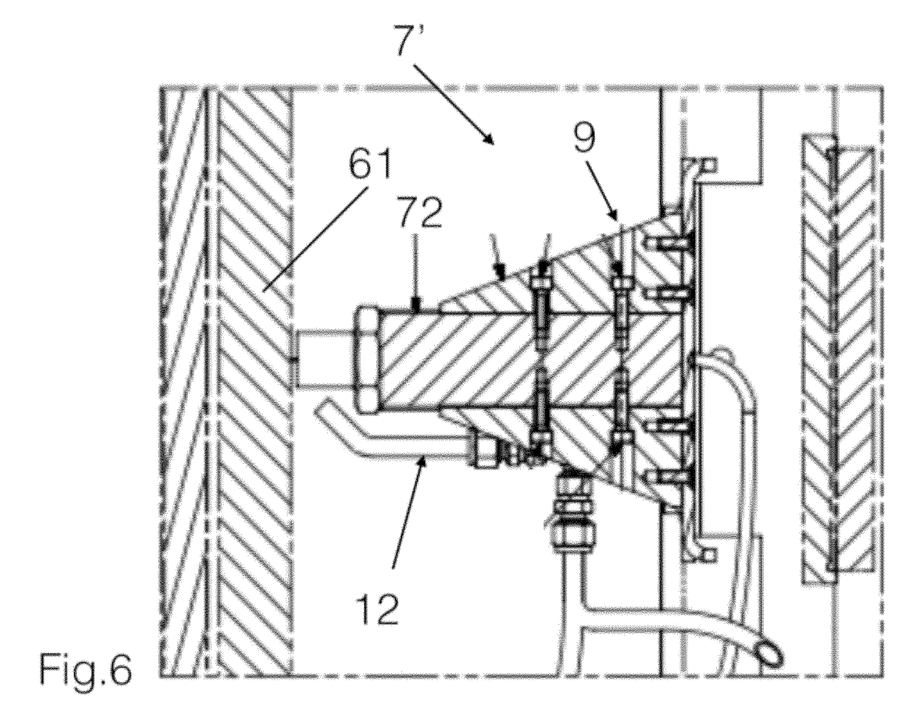

In the exemplary embodiment, as shown in FIGS. 3-5, each measuring station 7',7" comprises at least two sensor 71,72 each having one measuring tip 73,74; each measuring tip 73,74 of each sensor 71,72 faces one between the first 31 and the second 61 flange, so to measure the distance between each measuring tip and the relative first 31 or second 61 flange, and, particularly to measure a distance variation with respect to said reference distance.

Sensors are mounted on a support 9 so as to measure a distance or a distance variation respect to a reference distance in a direction parallel to the rotation axis 38 of the shafts.

In one embodiment said sensors are of contactless type, for example optical (ex. laser) or similar, or those sensors are of eddy current type: eddy current sensors are well known in the art and will not be described in detail here.

In one embodiment two measuring stations 7',7" are provided; in another embodiment each one of said two measuring stations 7',7" is located at a corresponding measurement area of said first and second flange 31,61.

Figure 2:
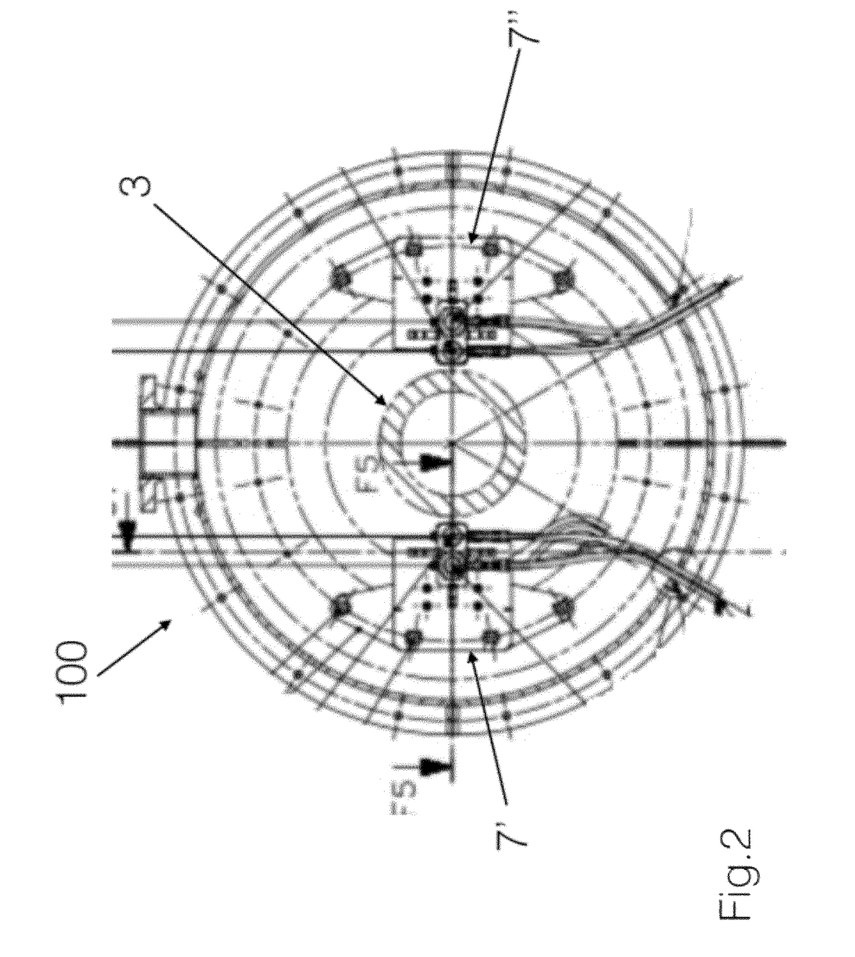
FIG. 2 shows a front cross-section of the coupling load measurement device of FIG. 1.

In one embodiment said two measuring stations 7',7" are located on opposite side of said hub 3, or in another embodiment lying at 180° each other with respect to a central rotation axis 38 of said hub 3, as can be clearly seen in FIG. 2.

This particular embodiment may allow to measure in two different areas of the coupling and to compensate for different measurements taken by the two stations 7',7": such compensation can be performed by the mean value between the two measurements.

In the exemplary embodiment, as shown in FIGS. 3-5, the measuring station 7',7" further comprises a support 9 for supporting said at least one sensor 71,72, or both sensors 71,72 when two are provided as in an embodiment of enclosed figures; the sensors 71,72 are mounted on the support 9 so as one of them face the first flange and, the other, the second flange.

The support 9 can be fixed on the ground or on a casing of an apparatus comprising at least one of the driving or driven shaft, or the hub.

In one embodiment the support 9 is made in a low thermal growth coefficient material.

In one embodiment, as shown in FIGS. 3-5, the measuring station 7',7" further comprises a cooling device for cooling said support 9 and/or said at least one sensor 71,72, so as to reduce measuring errors induced by thermal expansion of the sensors or of the support.

In an embodiment shown, the cooling device comprising at least one air duct 11,12 for sending an air flow on said support 9 and/or on said at least one sensor 71,72.

The air ducts 11,12 are operatively connected on their turn to sources of cooling air, such as cooling air piping, compressed air sources or similar, not shown.

It has to be noted that, alternatively, the cooling device can be operated with a different fluid than air, for example a liquid cooling for cooling sensors 71,72 and/or the support.

Furthermore, in other embodiments not shown there can be provided cleaning devices for cleaning the measurement surfaces or areas, in order to have a better measurement results; those cleaning devices are particularly useful when the sensors are, instead of eddy current sensors, optical sensor, for example laser sensors.

In this case, for reducing measurement errors, it is particularly useful keeping the measurement areas clean from dust; this can be obtained using a cleaning device, for example a flow of air directed toward those areas.

In a particular embodiment the cleaning device is incorporated in the cooling device already described: this can be obtained by suppling an air flow not only toward the sensors or the support, but also toward the flanges.

Figure 7:
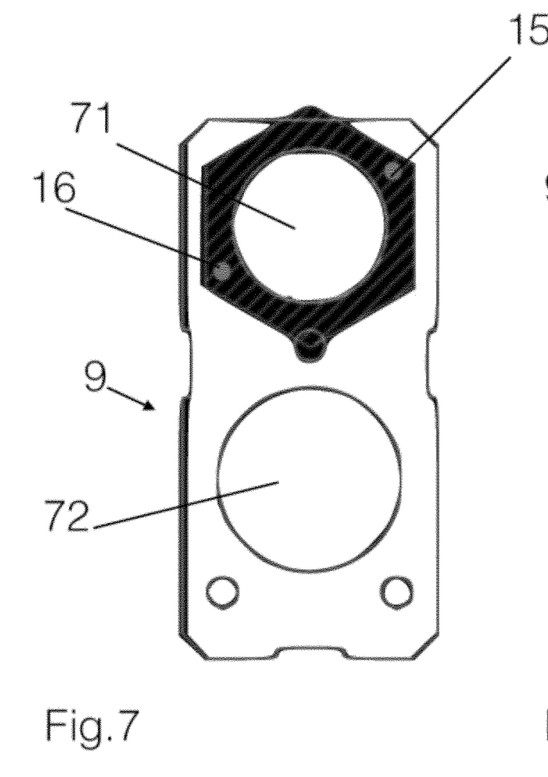
FIGS. 7 and 8 show a front view of a support for the measuring station of preceding figures provided with thermocouples.
Figure 8:
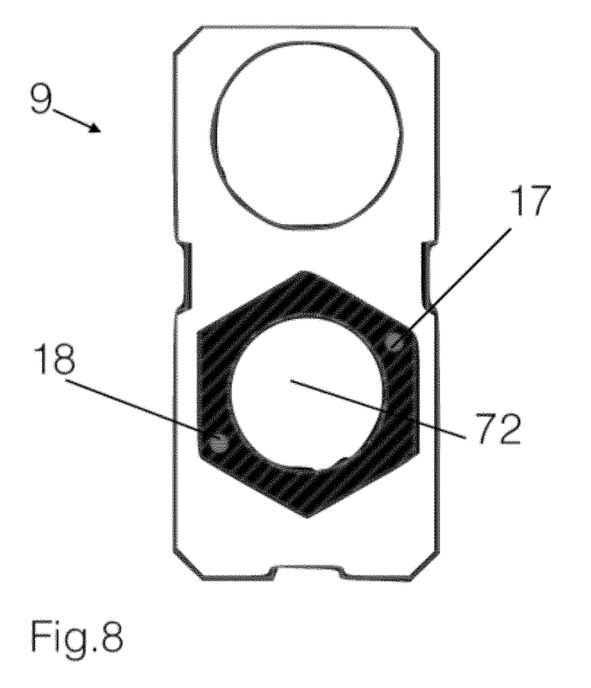

Since the thermal expansion or growth of the support or of the sensors can induce errors in measurement, it is important, in order to limit said measurement errors, to provide at least one temperature sensor, for each sensor, as shown in FIGS. 7, 8.

More particularly, with reference to the above figures, and in order to provide a very accurate measurement, a couple of temperature sensor 15,16;17,18 for each sensor 71,72 is provided.

As shown in FIGS. 7 and 8, temperature sensors 15,16; 17,18 of each couple are on opposite side of the relative sensor 71,72, on supporting ring structures fixed on the support 9 and extending around the peripheral body of each sensor.

With reference now to coupling load measurement method herein disclosed, it must be said that it can be used by means of the device 100 herein above disclosed.

Said method provides for measuring a load between a first driving, shaft 1, and a second, driven, shaft 2, particularly measuring an axial load between those shafts 1,2.

The above mentioned method comprises at least the step of measuring a distance variation respect to a reference distance between a first flange of the hub 31 and a second flange 61 of the flexible coupling element 5,6; this distance variation is measured in an operating condition, when the two shafts 1,2 are operated in rotation.

The method further comprises the step of using said measured distance variation for calculating said load.

Particularly, said load is calculated as a linear function of said measured distance.

More particularly being F said load and being X said measured distance variation respect to a reference distance, said load is calculated as $F=K*X$, under the hypothesis that the coupling between the shafts (coupling comprises at least one between the first or second shaft and the flexible coupling element and the connecting hub) has the behavior of a system of springs: then it will be possible to determine or measure the axial load acting on the shaft with a quite simple mathematical relation (Hooke Law).

Particularly, in case that one coupling element is provided for coupling the hub 3 to one between the first shaft, and the second shaft, then K is a coefficient substantially equal to the axial stiffness of said flexible coupling element.

When two coupling elements are provided for coupling the hub 3 to the first shaft 1, and to the second shaft 2, then K is a coefficient substantially equal to a sum of an axial stiffness of the flexible coupling elements.

In a not limited embodiment herein described, said measurement step is performed contactless with respect to said first and second flanges 31,61.

The contactless measurement allow to avoid wear between the measuring sensor and to perform better measurement; this is particularly useful when the driving shaft is a turbine shaft, since in operation the rotation speed is particularly high.

More particularly contactless measurement is performed by means of eddy current sensors.

More particularly, in operation, the contactless measurement step is performed at least by measuring a distance between said first flange 31 and a first measuring point 73 and by measuring a distance between said second flange 61 and a second measuring point 74.

In order to reduce errors in measurements, at least two different measurement areas 7',7" of said first and second flange 31,61 are provided.

More particularly said two measurement areas are on opposite side of said hub 3, lying at 180° each other with respect to a central rotation axis 38 of the hub 3.

Said measurement step is effected by at least one measuring station 7',7", and the method further provides the step of cooling at least said measuring station 7',7", at least said sensors.

Said cooling step is performed at least by an air flow directed toward said measuring sensors, said air flow having a temperature less than a temperature of said measuring station, so as to cool at least the sensors.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims

What is claimed is:

1. A coupling load measurement method for measuring load between a first driving shaft, and a second driven shaft connected by hub coupled both with the first shaft and with the second shaft at least one flexible coupling element coupled to the hub and to the first shaft and/or to the second shaft, the method comprising;

during operation of the shafts, measuring a distance variation in respect to a reference distance between a first flange of the hub and a second flange of the flexible coupling element; and using the measured distance variation for calculating the load, wherein the measurement is effected by at least one measuring station.

2. The method of claim 1, wherein the load is calculated as a linear function of the measured distance calculated as $F=K*X$, where F is the load, X is the measured distance variation respect to a reference distance, and K is a coefficient equal to an axial stiffness of the flexible coupling element.

3. The method of claim 1, wherein the measurement is performed without contact with the first and second flanges.

4. The method of claim 3, wherein the contactless measurement is performed at least by measuring a distance between the first flange and a first measuring point and by measuring a distance between the second flange and a second measuring point.

5. The method of claim 1, wherein the measurement step is performed in at least two different measurement areas of the first and second flange.

6. The method of claim 1, the method further comprising cooling in the at least one measuring station.

7. A coupling load measurement device-comprising:
a load between a first driving shaft, and a second driven shaft measured by the coupling load measuring device;
a hub coupled both with the first shaft and with the second shaft;
at least one flexible coupling element coupled to the hub and to the first shaft and/or to the second shaft, the flexible coupling element comprising at least one elastic element, the elastic element of the flexible coupling element being coupled with both the hub and one of the first or second shaft for transmitting torque between the hub and one of the first or second shaft;
a first flange of the hub;
a second flange of at the flexible coupling element, the second flange being coupled with the elastic element; and
at least one measuring station for measuring a distance variation respect to a reference distance between the first and second flange,
wherein the measurement is effected by the at least one measuring station.

8. The device of claim 7, wherein the second flange is a flange of a flexible coupling element coupled with the second, driven, shaft.

9. The device of claim 7, wherein the measuring station comprises at least one sensor for measuring the distance variation respect to a reference distance between the first and second flange.

10. The device of claim 9, wherein the measuring station comprises at least two sensors each having one measuring tip, the measuring tip of each sensor facing one between the first and the second flange, so to measure the distance between each measuring tip and the relative first or second flange.

11. The device of claim 7, comprising two measuring stations each one being located at a corresponding measurement area of the first and second.

12. The device of claim 7, wherein the two measuring station is located on opposite side of the hub.

13. The device of claim 8, wherein the measuring station further comprises:
a support for supporting the at least one sensor, and
a cooling device for cooling the support and/or the at least one sensor.

14. The device of claim 7, wherein the support comprises at least one temperature sensor for each sensor.

15. The method according to claim 2, wherein the at least one coupling element is one coupling element and the axial stiffness is provided for coupling the hub to one between the first driving shaft, and a second driven shaft and a sum of an axial stiffness of any of the flexible coupling elements.

16. The method according to claim 2, wherein the at least one coupling element is more than one coupling element and the axial stiffness is provided for coupling the hub to one between the first driving, shaft, and a second, driven shaft.

17. The method according to claim 3, wherein the measurement is preformed by eddy current sensors.

18. The method according to claim 5, wherein the two measurement areas are on opposite side of the hub.

19. The device according device to claim 11, wherein the two measuring station are located on opposite side of the hub.

20. The device according to claim 13 wherein the cooling device comprises at least one air duct for sending an air flow on the support and/or on the at least one sensor.

* * * * *